US00RE44065E

(19) United States
(12) Reissued Patent
Lee et al.

(10) Patent Number: US RE44,065 E
(45) Date of Reissued Patent: Mar. 12, 2013

(54) METHOD OF COMMUNICATING SIGNALS IN A MOBILE COMMUNICATION SYSTEM

(75) Inventors: Young Dae Lee, Anyang-si (KR); Sung Duck Chun, Anyang-si (KR); Myung Cheul Jung, Anyang-si (KR)

(73) Assignee: LG Electronics Inc., Seoul (KR)

(21) Appl. No.: 13/558,838

(22) Filed: Jul. 26, 2012

Related U.S. Patent Documents

Reissue of:
(64) Patent No.: 7,903,603
Issued: Mar. 8, 2011
Appl. No.: 11/917,480
PCT Filed: Jun. 13, 2006
PCT No.: PCT/KR2006/002252
§ 371 (c)(1),
(2), (4) Date: Dec. 13, 2007
PCT Pub. No.: WO2006/135185
PCT Pub. Date: Dec. 21, 2006

U.S. Applications:
(60) Provisional application No. 60/690,603, filed on Jun. 14, 2005.

(30) Foreign Application Priority Data

Apr. 25, 2006 (KR) ..... 10-2006-0037243

(51) Int. Cl.
*H04W 4/00* (2009.01)
(52) U.S. Cl. ..... 370/328; 370/401; 370/389; 455/422.1
(58) Field of Classification Search ..... None
See application file for complete search history.

(56) References Cited

U.S. PATENT DOCUMENTS

| | | | |
|---|---|---|---|
| 6,519,457 | B1 | 2/2003 | Jiang et al. |
| 6,553,003 | B1 | 4/2003 | Chang |
| 7,590,064 | B1 | 9/2009 | Zhang et al. |
| 7,724,766 | B2 | 5/2010 | Liao et al. |
| 2003/0003916 | A1 | 1/2003 | Foster et al. |
| 2003/0236085 | A1 | 12/2003 | Ho |
| 2004/0042491 | A1 | 3/2004 | Sarkkinen et al. |
| 2005/0058090 | A1 | 3/2005 | Chang et al. |
| 2006/0034240 | A1 | 2/2006 | Kwak et al. |
| 2006/0221993 | A1 | 10/2006 | Liao et al. |
| 2008/0268907 | A1 | 10/2008 | Senarath et al. |

FOREIGN PATENT DOCUMENTS

| | | |
|---|---|---|
| CN | 1385045 | 12/2002 |
| EP | 0777396 | 6/1997 |
| EP | 0891114 | 1/1999 |
| EP | 1276279 | 1/2003 |
| EP | 1519519 | 3/2005 |

(Continued)

OTHER PUBLICATIONS

CWTS/Huawei, "Synchronization of active cells based on direct NodeB interconnections", R3-013225, TSG-RAN WG3 Meeting #26, Jan. 2002.

(Continued)

*Primary Examiner* — Bob Phunkulh
(74) *Attorney, Agent, or Firm* — Lee, Hong, Degerman, Kang & Waimey

(57) ABSTRACT

A method of signalling in a mobile communication system, and more particularly, to a method of processing control information associates with handover in a mobile communication system is disclosed. In a radio (UE) user equipment receiving a service from a radio network including a plurality of base stations (E-NODE B), a control node (E-RNC) performing a control operation above the base stations and a processing node (SG5N) processing a user traffic above the base stations, the present invention includes the steps of transmitting a request message making a request for a specific service provided by a first base station to a second base station, the request message including control information indicating data to be received by the radio user equipment and receiving the data corresponding to the control information from the second base station.

20 Claims, 4 Drawing Sheets

FOREIGN PATENT DOCUMENTS

| | | |
|---|---|---|
| EP | 1714506 | 8/2005 |
| GB | 2396998 | 7/2004 |
| JP | 9186704 | 7/1997 |
| JP | 2002026919 | 1/2002 |
| JP | 2003102055 | 4/2003 |
| JP | 2003-324761 | 11/2003 |
| KR | 2000/0006160 | 1/2000 |
| KR | 2000/006160 | 1/2000 |
| KR | 2003-0048702 | 6/2003 |
| RU | 2221351 | 1/2004 |
| WO | 2004/001520 | 12/2003 |

OTHER PUBLICATIONS

CWTS/Huawei, "Synchronization of active cells based on direct NodeB interconnections", R3-020114, TSG-RAN WG3 Meeting #26, Jan. 2002.

"RAN2 Chairman LTE summary", RP-060204, Mar. 2006.

Alcatel, "Conclusions of 'HO Schemes for the User Plane' Discussion", R3-060507, 3GPP TSG RAN WG3 #51, Apr. 2006.

Alcatel, "Conclusions of 'HO Schemes for the User Plane' Discussion", R3-060520, 3GPP TSG RAN WG3 #51, Apr. 2006.

NEC, "Signalling messages for Data forwarding during HO", R3-060112, RAN Working Group 3 meeting #51, Feb. 2006.

NTT DoCoMo, "In-sequence delivery for lossless/no duplication handover", R3-060411, 3GPP TSG-RAN3#51bis, Apr. 2006.

Ericsson, "On requirements for a control plane eNodeB—eNodeB interface", R3-060446, 3GPP TSG RAN WG3 Meeting #51bis, Apr. 2006.

3rd Generation Partnership Project; "Technical Specification Group Radio Access Network; Feasibility Study on the Evolution of UTRAN Architecture; (Release 6)", R3-040425, 3GPP TR 25.897 V0.4.1, Feb. 2004.

Korean Intellectual Property Office Application Serial No. 10-2006-0037243, Notice of Allowance dated Dec. 21, 2012, 2 pages.

United States Patent and Trademark Office U.S. Appl. No. 13/014,699, Final Office Action dated Dec. 11, 2012, 8 pages.

METHOD OF COMMUNICATING SIGNALS IN A MOBILE COMMUNICATION SYSTEM

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a reissue of U.S. Pat. No. 7,903,603, which issued on Mar. 8, 2011, from U.S. application Ser. No. 11/917,480, filed on Dec. 13, 2007, which is the National Stage filing under 35 U.S.C. 371 of International Application No. PCT/KR2006/002252, filed on Jun. 13, 2006, which claims the benefit of earlier filing date and right of priority to Korean Application No. 10-2006-0037243, filed on Apr. 25, 2006, and also claims the benefit of U.S. Provisional Application Ser. No. 60/690,603, filed on Jun. 14, 2005.*

TECHNICAL FIELD

The present invention relates to a method of communicating signals in a mobile communication system, and more particularly, to a method of processing control information associated with handover in a mobile communication system.

BACKGROUND ART

Generally, the present invention is applicable to various communication systems. LTE (long term evolution) network evolving from UMTS (universal mobile telecommunications system) is explained as one example of the various communication systems, to which the present invention is applicable, in the following description.

FIG. 1 is a block diagram of LTE (long term evolution) network as a mobile communication system to which a related art or the present invention is applied.

The LTE network system has evolved from a conventional UMTS system. And, the 3GPP is working on the basic standardization of the LTE system.

An LTE network consists of a user equipment (hereinafter abbreviated UE), a base station (hereinafter abbreviated eNode B) and an access gateway (hereinafter abbreviated AG) located at an end of a network to be connected to an external network.

The AG includes a UPE (user plane entity) node responsible for a user traffic processing and an MME (mobility management entity) node responsible for a control. In this case, the MME and UPE nodes are able to communicate with each other via a new interface in-between.

At least one or more cells can exist in one eNode B. An interface X2 for a user or control traffic transmission is defined between the eNode Bs. And, an interface S1 is defined between the eNode B and the AG.

Layers of a radio interface protocol between a terminal and a network can be classified into L1 first layer), L2 (second layer0 and L3 (third layer) based on three lower layers of an open system interconnection (OSI) reference model widely known in communication systems. A physical layer belonging to the first layer provides an information transfer service using a physical channel. A radio resource control (hereinafter abbreviated RRC) layer located in the third layer plays a role in controlling radio resources between a terminal and a network. For this, the RRC layers enable RRC messages to be exchanged between the terminal and the network. The RRC layers can be distributed to network nodes including the eNode B, respectively. Instead, the RRC layer can be located at either the eNode B or the AG.

FIG. 2 is an architectural diagram of a radio interface protocol between UE (user equipment) and UTRAN (UMTS terrestrial radio access network) based on 3GPP radio access network specifications.

Referring to FIG. 2, a radio interface protocol vertically includes a physical layer, a data link layer, and a network layer and horizontally includes a user plane for data information transfer and a control plane for signaling transfer.

The protocol layers in FIG. 2 can be classified into L1 (first layer), L2 (second layer), and L3 (third layer) based on three lower layers of the open system interconnection (OSI) standard model widely known in the communications systems.

The respective layers of the radio protocol control plane shown in FIG. 2 and the radio protocol user plane shown in FIG. 3 are explained as follows.

First of all, the physical layer as the first layer offers an information transfer service to an upper layer using a physical channel. The physical layer is connected to a medium access control (hereinafter abbreviated MAC) layer above the physical layer via a transport channel. And, data are transferred between the medium access control layer and the physical layer via the transport channel. Moreover, data are transferred between different physical layers, and more particularly, between one physical layer of a transmitting side and the other physical layer of a receiving side via the physical channel.

The medium access control (hereinafter abbreviated MAC) layer of the second layer offers a service to a radio link control layer above the MAC layer via a logical channel. A radio link control (hereinafter abbreviated RLC) layer of the second layer supports reliable data transfer. A function of the RLC layer can be implemented by a function block within the MAC. In this case, the RLC layer may not exist. And, the MAC and RLC layers exist in an eNode B of a network.

A packet data convergence protocol (hereinafter abbreviated PDCP) layer of the second layer plays a header compression function to reduce an IP packet header size containing unnecessary control information having a relatively big size to enable efficient transmission of packets of IP such as IPv4 and IPv6. The PDCP layer exists in the AG of the network. The PDCP layer exists at an MME (mobility management entity) or the PDCP layers exist at the MME and a UPE (user plane entity), respectively.

A radio resource control (hereinafter abbreviated 'RRC') layer located in a highest part of the third layer is defined in the control plane only and is associated with configuration, reconfiguration and release of radio bearers to be responsible for controlling the logical, transport and physical channels (hereinafter, the radio bearer will be abbreviated RB). In this case, the RB means a service offered by the second layer for the data transfer between the UE and the UTRAN. And, the RRC layer in the network is located at the eNOde B.

As downlink transport channels carrying data to a UE from a network, there are a broadcast channel (BCH) carrying system information and a downlink shared channel (SCH) carrying a user traffic or control message.

And, the configuration of RB means a process of regulating characteristics of protocol layers and channels necessary for offering a specific service and a process of setting their specific parameters and operational methods, respectively. A traffic or control message of a downlink multicast or broadcast service can be transmitted via the downlink SCH or a separate multicast channel (MCH).

Moreover, as uplink transport channels carrying data from a UE to a network, there are RACH (random access channel) carrying an initial control message and an uplink SCH carrying a user traffic or control message.

DISCLOSURE OF THE INVENTION

Accordingly, the present invention is directed to a method of signaling in a mobile communication system that substantially obviates one or more of the problems due to limitations and disadvantages of the related art.

An object of the present invention is to provide a method of signaling in a mobile communication system, by which a problem of data loss, which occurs when a radio UE moves away into a new base station, can be efficiently handled.

In order to immediately handle a data loss problem which may occur when a radio UE moves away into a new base station, the present invention is characterized in that, if a radio UE attempts to receive the same service from the new base station, the radio UE transfers a sequence number for specific data the radio UE attempts to receive to the new base station. Unlike the related art, the present invention is characterized in that a UE moving away into a new base station transfers a sequence number for specific data the UE attempts to receive to the new base station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in a radio user equipment receiving a service from a radio network including a plurality of base stations, a control node performing a control operation above the base stations and a processing node processing a user traffic above the base stations, a method of signaling in a mobile communication system according to the present invention includes the steps of transmitting a request message making a request for a specific service provided by a first base station to a second base station, the request message including control information indicating data to be received by the radio user equipment and receiving the data corresponding to the control information from the second base station.

Preferably, the control information is information for a sequence number of the data received by the radio user equipment.

Preferably, the control information is information for a sequence number for a downlink data unit.

Preferably, the control information is a sequence number indicating the data not completely received from the first base station.

Preferably, the control information is a sequence number corresponding to a data unit of an ELC or MAC layer of the first base station.

Preferably, the radio user equipment performs a handover to the second base station from the first base station.

Preferably, the method further includes the step of transmitting a message requesting to suspend data transmission/reception to the second base station.

Preferably, the method further includes the steps of measuring channel quality for a plurality of the base stations and transmitting a result of measuring the channel quality to at least one of a plurality of the base stations.

Preferably, the method further includes the steps of measuring channel quality for a plurality of the base stations and transmitting a result of measuring the channel quality to the control node.

To further achieve these and other advantages and in accordance with the purpose of the present invention, in a specific first base station on a radio network including a plurality of base stations, a control node performing a control operation above the base stations and a processing node processing a user traffic above the base stations, a method of signaling in a mobile communication system includes the steps of receiving a request message requesting a specific service provided by a second base station from a radio user equipment and making a request for initiating data transmission/reception for the radio user equipment to the processing node.

Preferably, the second base station receives a message requesting to suspend the data transmission/reception for the radio user equipment from the radio user equipment.

More preferably, the second base station requests the processing node to suspend the data transmission/reception for the radio user equipment.

Preferably, the method further includes the step of transmitting a message requesting to include the first base station in an active set for the radio user equipment to the control node.

Preferably, the method further includes the step of transmitting a message requesting to remove the first base station from an active set for the radio user equipment to the control node.

Preferably, the method further includes the step of receiving information indicating whether the first base station is included in an active set for the radio user equipment from the control node.

To further achieve these and other advantages and in accordance with the purpose of the present invention, in a specific first base station on a radio network including a plurality of base stations, a control node performing a control operation above the base stations and a processing node processing a user traffic above the base stations, a method of signaling in a mobile communication system includes the steps of receiving user equipment information including control information indicating data to be transmitted to a radio user equipment performing a handover from a second base station, receiving a message instructing an initiation of data transmission/reception to/from the radio user equipment from the processing node, and transmitting the data corresponding to the control information to the radio user equipment.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

In the related art, a UE transfers signaling to a base station controller (RNC) in moving away into a new base station (eNode B). However, since only the base station controller is able to handle a data loss problem that may occur when a UE moves away into a new base station, the data handling is slowed down.

This document provides a method of signaling by which a problem of data loss, which occurs when a radio UE moves away into a new base station, can be efficiently handled.

Handover methods according to embodiments of the present invention are explained with reference to FIGS. 4 to 6 as follows.

Figure 1:
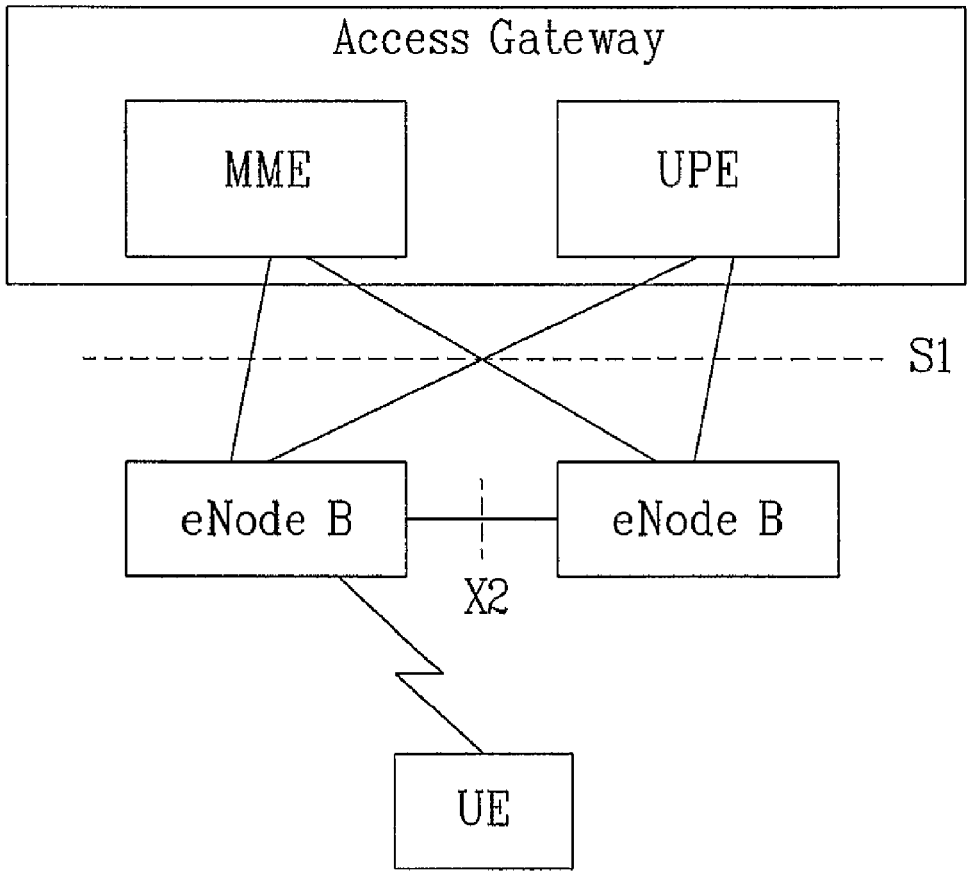
FIG. 1 is a block diagram of LTE (long term evolution) network as a mobile communication system to which a related art or the present invention is applied.
Figure 2:
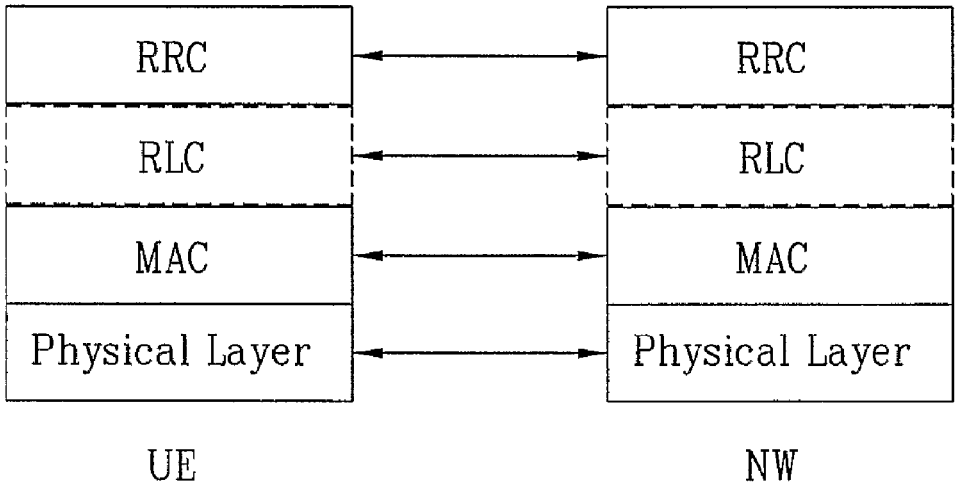
FIG. 2 is an architectural diagram of a control plane between UE (user equipment) and UTRAN (UMTS terrestrial radio access network) based on 3GPP radio access network specifications.
Figure 3:
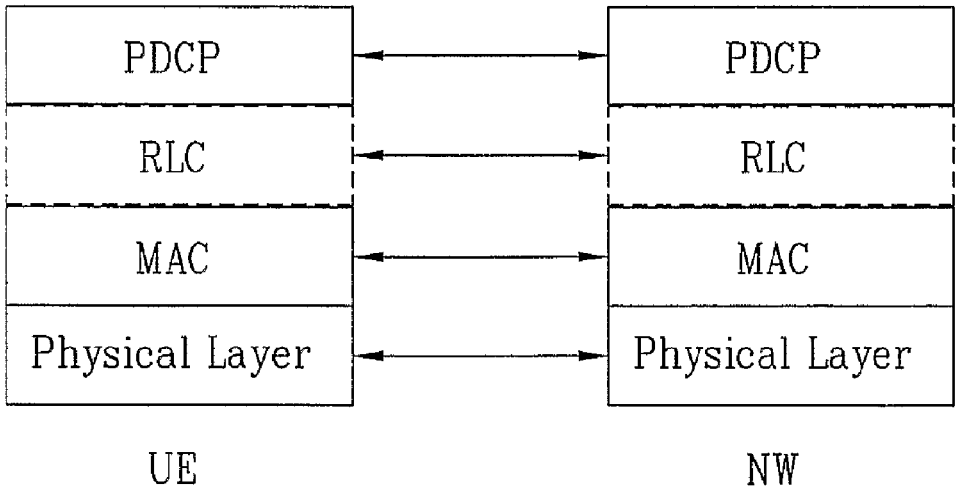
FIG. 3 is an architectural diagram of a user plane between UE (user equipment) and UTRAN (UMTS terrestrial radio access network) based on 3GPP radio access network specifications.
Figure 4:
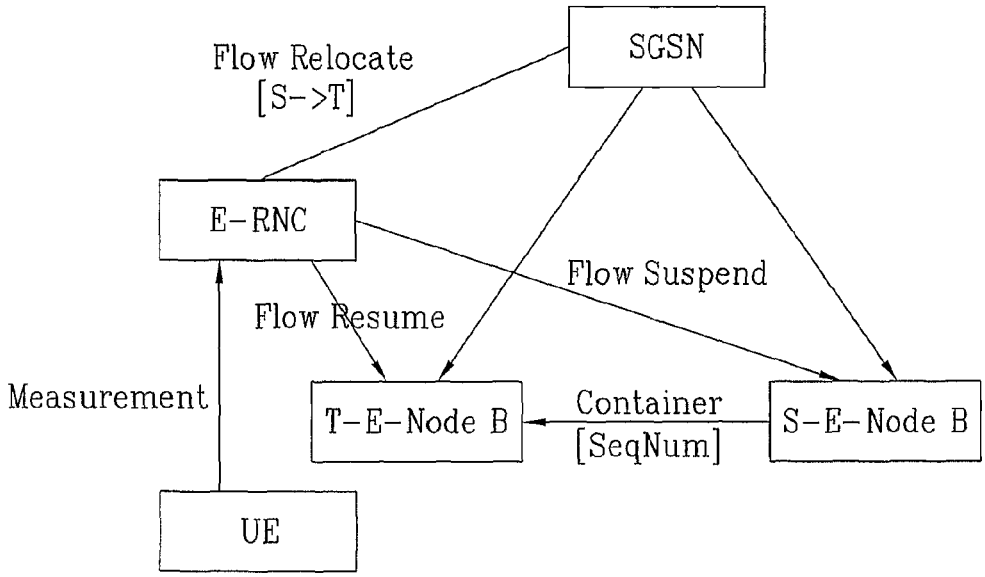
FIG. 4 is block diagram for a handover method according to a first embodiment of the present invention.
Figure 5:
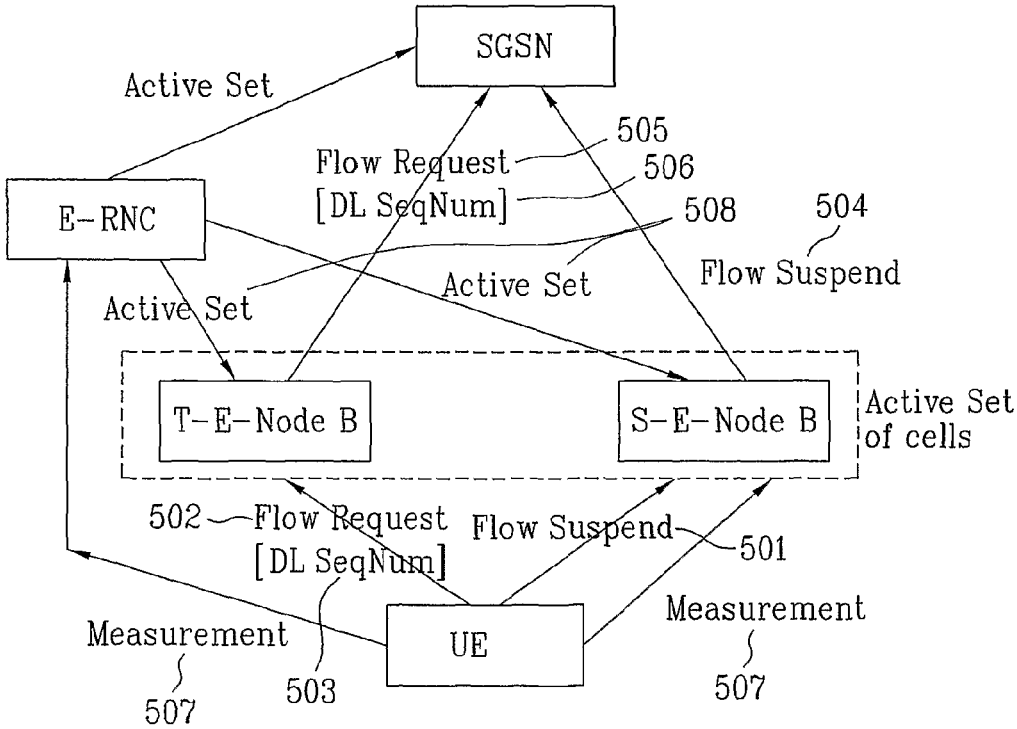
FIG. 5 is block diagram for a handover method according to a second embodiment of the present invention.
Figure 6:
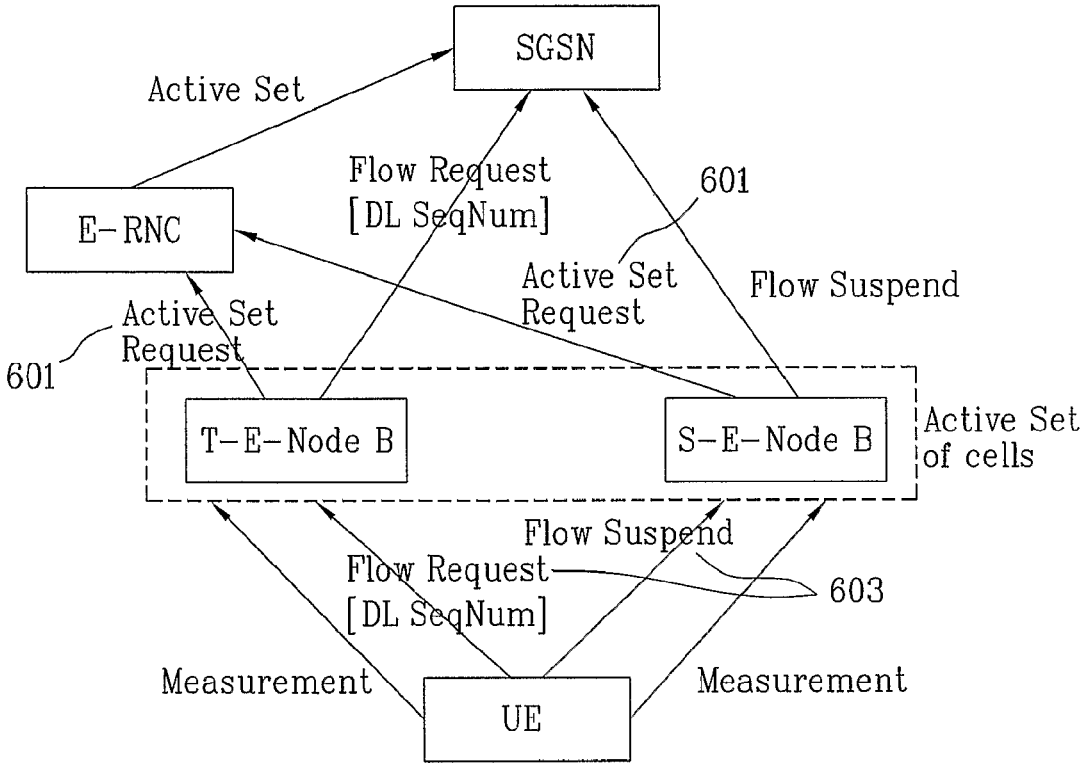
FIG. 6 is block diagram for a handover method according to a third embodiment of the present invention.

First of all, network entities shown in FIGS. 4 to 6 are able to perform various functions.

A serving GPRS supporting node (hereinafter abbreviated SGSN) takes charge of a UPE function of transferring a user traffic to an eNode B and an E-RNC is responsible for an MME function of taking charge of various control functions.

Both of the SGSN and the E-RNC are included in an AG. So, a MAC layer and an RLC layer are located at the eNode B and a PDCP layer is located at the SGSN.

A T-E-Node B (hereinafter abbreviated SNB) indicates a new target base station to which a UE is going to move into and an S-E-Node (hereinafter abbreviated SNB) indicates an old source base station where the UE is located before handover.

FIG. 4 is block diagram for a first handover method according to a embodiment of the present invention.

Referring to FIG. 4, once a radio UE decides to initiate a handover to a TNB from an SNB, the SNB transfers an container to the TNB. The container includes information associated with the UE executing the handover operation. In this case, a sequence number (hereinafter abbreviated SeqNum) for data received/transmitted by the UE is included in the container.

The TNB transfers a data unit to the UE performing the handover operation according to the sequence number. In particular, the TNB transmits a data unit of an RLC or MAC layer corresponding to the sequence number to the UE. The sequence number is the information for a number for identifying at least one data unit transmitted to the UE and can be implemented in various forms. Preferably, the sequence number is managed by the RLC or MAC layer for example.

FIG. 5 is a block diagram for a second handover method according to a embodiment of the present invention.

Referring to FIG. 5, before initiating a handover, a UE informs an SNB that the SNB should suspend data transmission/reception (Flow Suspend message) and informs a TNB that the TNB needs to initiate data transmission/reception (Flow Request message).

The Flow Suspend message can be transmitted like '501' shown in FIG. 5 and the Flow Request message can be transmitted like '502' shown in FIG. 5.

In this case, a sequence number of a data unit of an RLC or MAC layer to be transmitted/received by the UE is included in the message transmitted to the TNB by the UE (503). In this example, a downlink sequence number DL_SeqNum is transmitted.

The TNB is able to transmit at least one data unit of the RLC or MAC corresponding to the sequence number after having received the information. The downlink sequence number is a sequence number for identifying downlink data transmitted to the UE from a base station, i.e., the TNB and can be managed by the RLC or MAC layer.

If transmission/reception control of SGSN as an upper node of NB (TND or SNB) is required for handover, the SNB having received the Flow Suspend message informs the SGSN that the SGSN should suspend data transmission/reception (504). The TNB having received the Flow Request message is able to make a request of initiating the data transmission/reception to the SGSN (505).

In case of making the request for the data transmission/reception (505), the TNB is able to deliver the sequence number information (506) transferred by the UE to the SGSN. In this case, the sequence number (506) needs to be recognized by the SGSN. So, the sequence number 506 can correspond to a sequence number managed by a PDCP or security layer located at the SGSN. Namely, since each sequence number should be information recognizable by a network entity to which the sequence number is delivered and should correspond to a sequence number managed by the network entity.

An E-RNC, as shown in FIG. 5, is able to manage an active set to support mobility of the UE. In particular, at least one eNode B used for data transmission/reception for one specific UE can be managed by being included in the active set for the UE.

For this, the E-RNC receives measurement information (507) of the UE for reception power of several cells to manage the active set. The measurement information can be delivered to the E-RNC via such a base station as an SNB or can be directly delivered to the E-RNC from the UE. In FIG. 5, both of the TNB and the SNB are included in the active set for a specific UE.

Meanwhile, in the embodiment shown in FIG. 5, the E-RNC is able to deliver information 508 to each eNode B included in the active set and the corresponding SGSN. The information indicates that the eNode B which received the information 508 is included in the active set.

FIG. 6 is block a diagram for a third handover method according to a embodiment of the present invention.

Referring to FIG. 6, an E-RNC enables an eNode B to be included in or removed from an active set according to a request (Active Set Request) made by the corresponding eNode B (601). In this case, the eNode B can make a request an inclusion/removal in/from the active set according to a request (Flow Request/Flow Suspend) (603) made by a UE.

One active set is managed for each UE. The UE or eNode B can make a request to an AG for including/removing a specific eNode B or cell in/from the active set via such a message as Flow Request, Flow Suspend, and Measurement proposed by the present invention. In general, one eNode B in an active set transmits data to a corresponding UE or receives data from the corresponding UE.

Meanwhile, in case of bi-cast that one UPE transmits data to at least two eNode Bs simultaneously, the at least two eNode Bs are included in the active set.

INDUSTRIAL APPLICABILITY

Accordingly, in case that a radio UE attempts to receive a same service from a new base station after having handed over to the new base station, the present invention enables the radio UE to deliver a sequence number for specific data the radio UE attempts to receive to the new base station, thereby enabling the radio UE to immediately handle a data loss problem that may occur in handover made by the radio UE.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of communicating signals in a mobile communication system having a first base station, a second base station, and a base station controlling node controlling the first base station and the second base station, the method comprising:

transmitting, from the mobile station to one of the first base station and the second base station, a first control message including a sequence number indicating at least one data unit to be received from one of the first base station and the second base station or to be transmitted from the mobile station to one of the first base station and the second base station, wherein the first base station and the second base station exchange information without being controlled by the base station controlling node; and communicating the at least one data unit indicated by the sequence number with one of the first base station and the second base station.

2. The method of claim 1, wherein the step of transmitting is performed when the mobile station executes a handover operation.

3. The method claim 1, wherein the first base station is a source base station and the second base station is a target base station.

4. The method claim 3, wherein the first control message is transmitted to the target base station.

5. The method claim 3, further comprising:

transmitting a second control message indicating a suspension of data transmission from the mobile station to the source base station.

6. The method of claim 1, wherein the base station controlling node is an access gateway.

7. The method of claim 1, wherein the base station controlling node comprises a first entity and a second entity, wherein the first entity controls user traffic and the second entity controls mobility management.

8. The method of claim 7, wherein the first entity is a user plane entity (UPE) and the second entity is a mobility management entity (MME).

9. The method of claim 1, wherein each of the base stations comprises a medium access control (MAC) layer.

10. The method of claim 9, wherein each of the base stations further comprises a radio link control (RLC) layer.

11. A method of communicating signals in a mobile communication system having a first base station, a second base station, and a base station controlling node controlling the first base station and the second base station, the method comprising:

receiving at the first base station a first control message from a mobile station including a sequence number indicating at least one data unit to be transmitted to the mobile station or to be received from the mobile station, wherein the first base station and the second base station exchange information without being controlled by the base station controlling node; and communicating the at least one data unit indicated by the sequence number with the mobile station.

12. The method of claim 11, wherein the step of receiving is performed when the mobile station executes a handover operation.

13. The method claim 11, wherein the first base station is a target base station and the second base station is a source base station.

14. The method claim 13, wherein a second control message indicating a suspension of data transmission from the mobile station is transmitted to the source base station.

15. The method of claim 11, wherein the base station controlling node is an access gateway.

16. The method of claim 11, wherein the base station controlling node comprises a first entity and a second entity, wherein the first entity controls user traffic and the second entity controls mobility management.

17. The method of claim 16, wherein the first entity is a user plane entity (UPE) and the second entity is a mobility management entity (MME).

18. The method of claim 11, wherein each of the base stations comprises a medium access control (MAC) layer.

19. The method of claim 18, wherein each of the base stations further comprises a radio link control (RLC) layer.

20. A method of communicating signals in a mobile communication system having a first base station, a second base station, and a base station controlling node controlling the first base station and the second base station, the method comprising:

receiving, from the mobile station at the first base station, a first control message including a sequence number indicating at least one data unit to be transmitted or to be received from the mobile station, wherein the first base station and the second base station exchange information without being controlled by the base station controlling node; and transmitting a second control message including the sequence number to the second base station.

* * * * *